May 31, 1960
R. JOHNSON
2,939,101
CONDUCTOR CONDUIT FOR MULTIPLE ELECTRICAL OUTLET SYSTEM
Filed May 2, 1957
2 Sheets-Sheet 1
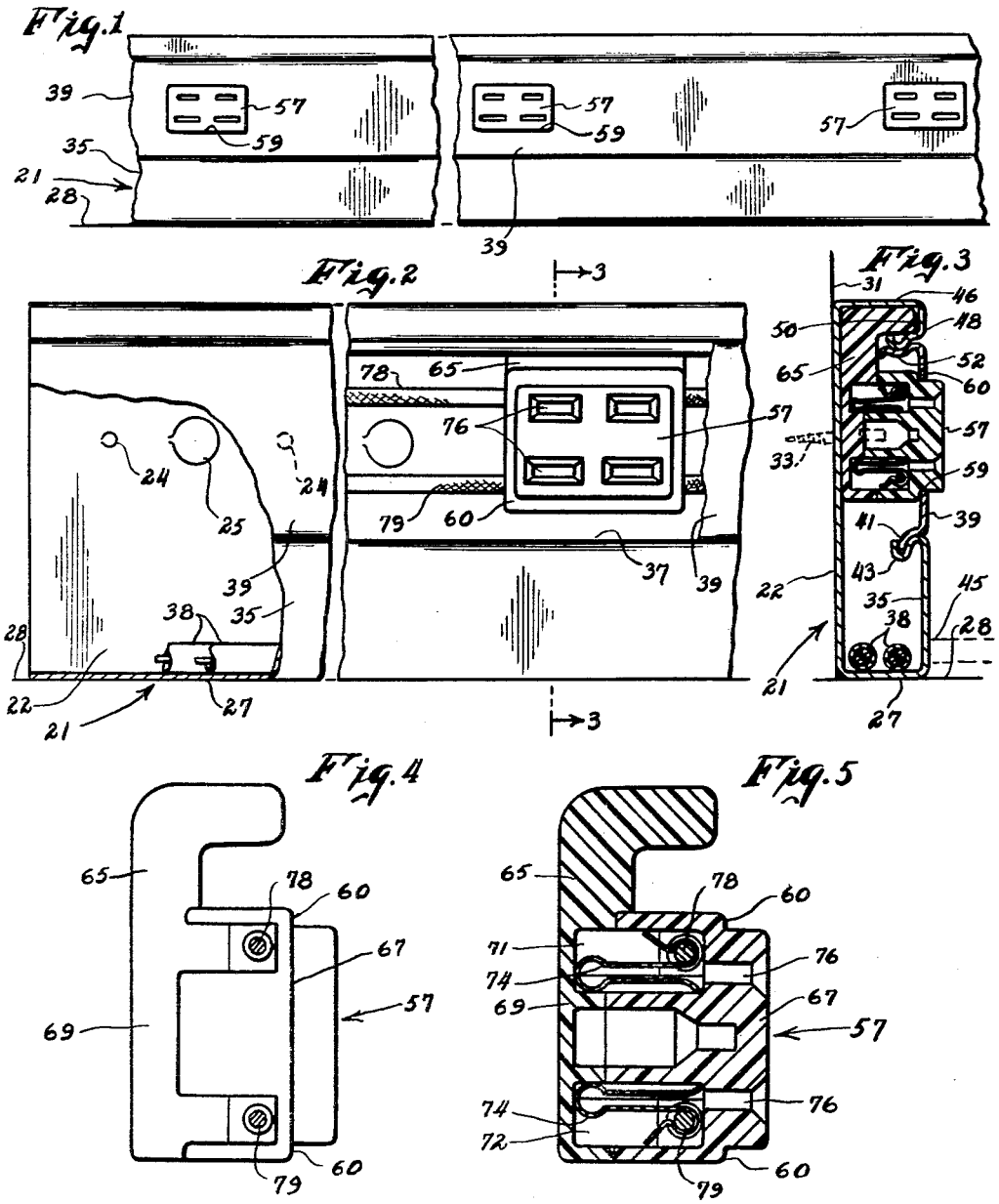
INVENTOR.
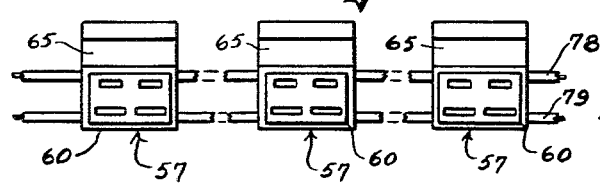
ATTORNEYS

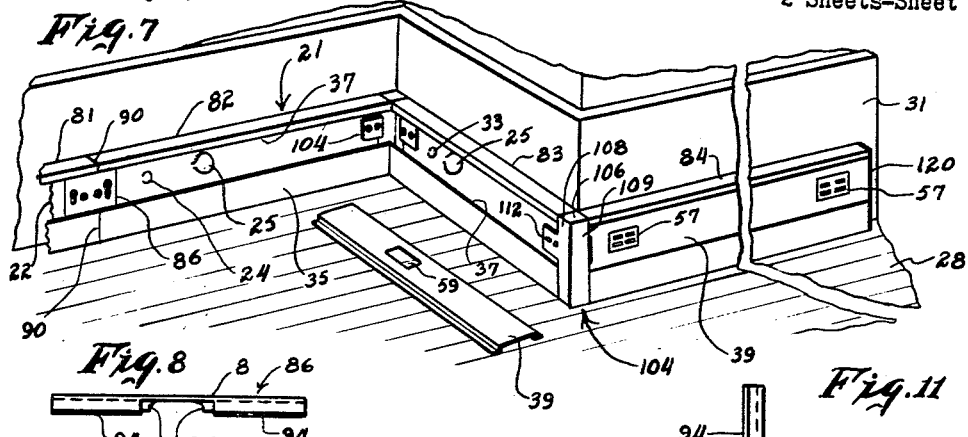

United States Patent Office 2,939,101
Patented May 31, 1960

2,939,101

CONDUCTOR CONDUIT FOR MULTIPLE ELECTRICAL OUTLET SYSTEMS

Robert Johnson, Edgeworth, Pa., assignor, by mesne assignments, to H. K. Porter Company Inc., Pittsburgh, Pa., a corporation of Delaware Filed May 2, 1957, Ser. No. 656,693

13 Claims. (Cl. 339—23)

This invention relates to multiple outlet electrical systems of the kind that are used in place of the baseboard of a room to provide electrical outlets at convenient locations for plugging in a floor lamp, radio or other electrical equipment. These electrical systems can also be used along work benches and any other places where spaced outlets are useful.

It is an object of the invention to provide an improved multiple outlet electrical system suitable for use around the wall of a room in place of the baseboard; and more especially it is an object of the invention to provide a multiple outlet electrical system which can be installed at lower cost than comparable systems of the prior art.

It is another object of the invention to provide an electrical system having a duct with a snap-in cover, and one which can be removed in order to gain access to the duct for inserting additional wires when desirable, or for repairing receptacles if necessary. It is a feature of the invention that the snap-in cover is located at some distance above the bottom of the duct so that linoleum, tile, or other floor covering placed in front of the duct does not interfere with subsequent removal of the cover.

Another feature of the invention relates to the supporting of the receptacles from the duct by hooks on the receptacles which are rocked into a channel at the top of the duct. This provides quick and convenient connection of the receptacles to the duct while leaving them free to move laterally as necessary to bring them into exact register with opening in the cover that closes the front of the duct; and portions of the cover around the edges of these openings contact with shoulders or other surfaces of the receptacles to hold the receptacles in position after the cover is attached to the duct.

Another object of the invention is to provide improved connecting means between successive sections of duct in a multiple outlet electrical system of the character indicated. Features of the connecting means relate to elbow structures for joining sections of duct at corners of a wall; to constructions that permit the same kind of elbow-piece to be used on either an inside or an outside corner; and to constructions for providing ground continuity of the duct, all with parts that can be assembled into a complete system with a minimum of labor and expense.

Other objects, features and advantages of the invention will appear or be pointed out as the description proceeds.

In the drawing, forming a part hereof in which like reference characters indicate corresponding parts in all the views:

Figure 1 is a fragmentary front view of a multiple outlet electrical system made in accordance with this invention;

Figure 2 is a greatly enlarged fragmentary view, partly broken away, showing details of the structure illustrated in Figure 1;

Figure 3 is a sectional view taken on the line 3—3 of Figure 2;

Figure 4 is an end view of a receptacle similar to that shown in Figure 3;

Figure 5 is a sectional view through the receptacle shown in Figure 4;

Figure 6 is a detailed view showing the way successive receptacles are connected together by conductors for supplying power to the receptacles;

Figure 7 is a perspective view showing the way in which the electrical system of this invention is installed as a baseboard of a room;

Fig. 8 is a top plan view of one of the connectors shown in Figure 7, this view being on a greatly enlarged scale;

Fig. 9 is a front view of the connector shown in Figure 8;

Figure 10 is an end view, partly in section, of the connector shown in Figures 8 and 9 with a contact screw inserted therein;

Figure 11 is a top plan view of a connector similar to that shown in Figure 8 but shaped to serve as a connector between duct sections at an outside corner;

Figure 12 is a front view of the connector shown in Figure 11;

Figure 13 is an end view of the connector shown in Figures 11 and 12;

Figure 14 is a top plan view of one of the elbow elements shown in Figure 7, the view being on a greatly enlarged scale;

Figure 15 is a front view of the elbow element shown in Figure 14;

Figure 16 is an end view of the elbow element shown in Figures 14 and 15;

Figure 17 is a top plan view of an end plate used to close the end of the last section of the duct shown in Figure 7;

Figure 18 is a front view of the end plate shown in Figure 17; and

Figure 19 is an end view of the end plate shown in Figures 17 and 18.

Figures 1, 2 and 3 illustrate an electrical system in which there is a duct 21 having a back wall 22 for connection to a wall of a room as the baseboard at the bottom of a wall. The invention can be used at other locations. There are knock-outs 24 and 25 in the back wall 22. The knock-outs 24 are used to provide holes for screws or other fastening means by which the duct is connected to a wall; and the knock-outs 25 are used to provide openings for register with openings in the wall through which a connector passes to carry the conductors that are led into the duct.

The duct 21 has a bottom wall 27 which can be rested directly on a floor 28 of the room in which the system is to be located. Figure 3 shows the duct 21 secured to a wall 31 by a screw 33 extending through a hole left by removing one of the knock-outs 24.

The duct 21 has a front wall 35 extending upwardly for a substantial distance above the bottom wall 27. There is an opening extending lengthwise of the duct, and indicated by the reference character 37 in Figure 2. This space within the duct behind the front wall provides additional wiring space accessible through the openings 37 even when the receptacles of this invention are in place. This lower section of the duct can be used for low potential conductors, such as telephone wires 38, enclosed in metallic flexible conduit as required by the Underwriters.

The opening 37 is closed, when the electrical system is fully assembled, by a cover 39. The cover has a bottom edge 41 which engages in a complementary edge having a recess 43 along the front opening of the duct, and this engagement of the edge 41 in the recess 43 provides, in effect, a hinge at the lower edge of the cover 39 for holding the lower edge of the cover in position while the cover is swung upwardly to a location where it will snap into the duct opening.

The advantage of having a permanent front wall 35 below the cover 39, instead of having the cover reach over to the bottom of the ducts 20 is that linoleum, tile or other floor covering, indicated by the reference character 45 cannot interfere with the removal of the cover 39 in the illustrated construction, whereas it might interfere if the cover extended downwardly below the level of the floor covering.

The construction for obtaining snap action, for holding the cover 39 in place, is best shown in Figure 3. A top wall 46 of the duct has its forward portion extending downwardly, and this downwardly extending portion is designated by the reference character 48 in Figure 3. At its lower end, this downwardly extending portion 48 turns inwardly to provide the top edge of the front opening of the duct and also to form a channel 50 opening toward the back of the duct.

The upper end of the cover 39 has an inwardly extending lip 52. Both the lower edge of the downwardly extending portion 48 and the top of the inwardly extending lip 52 are curved so as to serve, in effect, as cam surfaces to produce a downward bending of the lip 52 as the cover 39 is swung about its hinge engagement at its lower edge and is brought into contact with the curved surface at the top of the duct opening. As soon as the forward edge of the lip 52 has passed the lowest part of the complementary edge at the top of the duct opening, the complementary edge can engage the depression in the top of the lip 52 and this causes the cover 39 to snap into the position shown in Figure 3. It can likewise be disengaged by inserting a tool, such as the screw-driver, between the downwardly extending portion 48 and the upper part of the cover 39 to reverse the process by which the cover was snapped into position.

It will be understood that the connection of the cover with the upper part of the duct can be obtained with different contours for the confronting faces of the cover and duct, and the construction illustrated is merely representative of means for snapping the cover into place. Some features of the invention can be used with other kinds of covers.

At spaced regions along the length of duct 21, there are receptacles 57 into which drop cord plugs can be inserted. There are openings 59 through the cover 39 in positions to register with the receptacle locations; and in the preferred construction, each receptacle 57 has a front face which extends through the opening 59, as best shown in Figure 3. A short distance back from the face of each receptacle 57 there is a shoulder 60 which contacts with the inside face of the cover 39 around the edges of the opening 59 for holding the receptacle 57 against the back walls 22 of the duct 21.

There is a hook 65 extending upwardly from the rearward portion of each receptacle 57. This hook extends upwardly and then forwardly into the channel 50. The hook is shaped so that the receptacle 57 can be inserted into the duct 21, before the cover 39 is in place, with a rocking movement which can be performed conveniently and quickly when initially assembling the system of this invention. The receptacle 57 is advanced through the duct opening with the hook 65 foremost and as the hook reaches the back wall 22, the receptacle is moved upwardly so that the hook approaches the top wall 46. The receptacle 57 is rocked in a clockwise direction, as viewed in Figure 3, and this causes the hook to engage in the channel 50 while the receptacle 57 swings downwardly and into contact with the back wall 22.

When the cover 39 is snapped in place, as shown in Figure 3, the receptacle 57 is held against forward movement, but if a receptacle is to be taken out of the duct, it is merely necessary to remove the cover 39 and to swing the receptacle in a counterclockwise direction so that it is taken out by a rocking movement which is the reverse of that by which it was initially put into the duct.

Figure 5 shows a sectional view through the receptacle 57. The receptacle has a front section 67 and a rearward section 69. In the preferred construction the hook 65 is molded as one piece with the rearward section 69. The sections 67 and 69 are secured together by bonding material or by fastening means, as desired. The sections 67 and 69 enclose an upper chamber 71 and a lower chamber 72. These chambers 71 and 72 enclose spring contacts 74 for receiving the prongs of a drop cord plug, there being slots 76 through the front section 67 for admitting the prongs into the spring contacts 74.

The conductors 78 and 79 extend through the chambers 71 and 72, respectively. These conductors extend from one receptacle 57 to another and are insulated where they pass between receptacles 57; but the insulation is removed in the chambers 71 and 72 so that the spring contacts 74 are snapped on the bare wire.

Figure 6 shows three successive receptacles 57 connected to the same conductors 78 and 79 whereby the various receptacles are connected to the power circuit in parallel. Although the receptacles shown are ungrounded, it will be understood that grounded and switch-controlled receptacles can be used instead of the receptacles illustrated.

If the openings in the cover of the duct are located every five feet, then the spacing of the receptacles 57 along the conductors 78 and 79 is a small fraction of an inch greater than five feet to allow for manufacturing tolerances since the conductors 78 and 79 can be allowed to sag in the duct to shorten the spacing of the receptacles 57 from one another; but it would not be practical to try to increase the spacing of the receptacles beyond what exists when the conductors 78 and 79 are stretched tightly along the duct.

Figure 7 shows the way in which the invention is installed as a baseboard of the wall 31. The construction illustrated includes four sections of the duct 21, the different sections being indicated by the reference characters 81, 82, 83 and 84. Although the sections of the duct come in standard lengths, it is necessary to cut these lengths to fit the dimensions of the room, for example, the section 82 is a short one cut from a standard length of duct, and so is the section 83. Section 84 is a standard length, parts of it being broken away and only two receptacle outlets being shown. Each section is connected to the wall 31, as previously described and with the bottom of the duct resting on the floor.

There are connectors between the adjoining sections of the duct. For example, between the sections 81 and 82, there is a connector 86. The body of the connector 86 consists of a flat portion 88 which contacts with the back walls of the joining sections 81 and 82 of the duct. The line along which the duct sections 81 and 82 abut against one another is indicated by the reference character 90.

There are slots 92 (Fig. 9) through the connector 86 for receiving screws that pass through openings in the back walls of the duct sections for securing the duct sections to the wall and for securing the connector 86 to the duct sections. The reason for having slots 92 instead of round holes, is that the openings in the back walls of the duct sections are preferably located approximately midway between the upper and lower edges of the opening through the front of the duct, and therefore not midway between the top and bottom of the duct. By having slots 92, instead of round holes, the connector 86 can be used with either end as the top and the slots 92 are long enough so that the hole through the back wall of the duct section will be located somewhere along the length of the slot 92.

There are lugs 94 extending outwardly from the top and bottom edges of the flat portion 88 of the connector 86. These lugs 94 extend in a direction at an angle to the back wall of the duct sections and contact with the top and bottom walls of the duct sections so as to hold the connector 88 against vertical displacement, and so as to hold the adjoining duct sections in line with each other. By having the lugs 94 extend at an angle to the back of the connector, greater strength is imparted to the connector and a stronger and more rigid joint is obtained between the sections of the duct. During assembly of the duct system, these lugs 94 scratch the enamel on the surface of the duct and establish metal-to-metal contact with the duct surfaces to create a grounding continuity.

The connector 86 provides a ground continuity between the successive duct sections 81 and 82, as required by the Underwriters Laboratories. This invention includes a special construction for insuring ground continuity without taking time to obtain bare metal contact between the conductor 86 and the walls of the duct sections 81 and 82 which are usually covered with lacquer or enamel that is an electrical insulator.

There are projections 95 at spaced locations on opposite sides of the center of the connector 86 and in position to overlie areas on the different duct sections when the connector is in use. Each of the projections 95 is preferably an extruded portion displaced from the flat section 88 of the connector. There is a threaded opening through each of the projections 95; and a contact screw 97, shown in Figure 10, is screwed into the threaded opening in each projection 95 until the screw 97 contacts firmly with the back of the duct behind the connector 86. The pressure from the reduced area at the end of the screw 97 combined with the rotary movement of the screw causes the screw 97 to pierce the lacquer or enamel on the back of the duct and thus establish a metal to metal contact between the screw and the back wall of the duct. Thus a ground connection is established from the back wall of one duct section, through the screw 97 and its threads to the connector 88, to the other screw 95 and from this other screw to the back wall of the other duct section.

When adjoining duct sections meet at an outside corner, as in the case of the sections 83 and 84 in Figure 7, an angular connector must be used. Such a connector 100 (Figures 11-13), which goes against the back walls of the duct sections, is obscured from view in Figure 7. Its construction is identical with that of the connector 86, shown in Figures 7-10, except that the angular connector 100, shown in Figures 11-13 is bent along its vertical center line so that the adjoining halves of the connector are at right angles to one another, as best shown in Figure 11. These adjoining halves of the connector 100 are in contact with the front surfaces of the respective duct sections that meet at the outside corner. The relation of this connector 100 to the conductor sections 86 and 87 is the same as the relation of the connector 86 to its adjacent conductor sections except for the angle required to turn a corner, and it will be clearly understood from the description already given for the connector 86.

Parts of the connector 100 which correspond with the connector 86 are indicated by the same reference characters. As in the case of a straight connection, the lugs 94 hold the adjoining duct sections against vertical displacement with respect to one another, and screws extending through the projections 95 insure ground continuity without requiring that the installer take the time or trouble to obtain bare metal contact between the surfaces of the connector and the confronting surfaces of the duct sections.

When duct sections meet at an inside corner, as in the case of sections 82 and 83 in Figure 7, a different type of connector is used which will be referred to herein as an elbow element 104. This elbow element 104 is shown in detail in Figures 14-16. It has a top wall 106 which is flush with the top walls of the duct sections 82 and 83, and this top wall 106 fills the space left between the ends of the duct sections 82 and 83 and the wall 31 to which they are connected. The elbow element 104 has side walls 108 and 109. These form continuations of the back walls of the conduits sections which the elbow element 104 connects.

There are panels 112 and 113 extending from edges of the walls 108 and 109, respectively, at mid regions of these walls, the panels 112 and 113 being preferably of one-piece construction with the side walls 108 and 109 but offset somewhat so as to overlie the back walls of the conduit sections when the side walls 108 and 109 of the elbow element 104 are in the line with the back walls of the duct sections.

In the preferred construction illustrated, this offset of the panels 112 and 113 is sufficient to actually space the panels some distance inward from the back panels of the duct sections. This spacing provides clearance for the projections 95 displaced from the panels 112 and 113. There are bent edges 115 at the free ends of the panels 112 and 113; and these edges contact with the back walls of the duct sections to hold the panels 112 and 113 parallel with the back walls when the elbow element 104 is in assembled relation with the duct sections which it is used to connect.

A lug 118 extends from the top wall 106 with a slight offset equal to the thickness of the top wall of a duct section so that the lug 118 is in position to contact the bottom surface of a top wall of a duct section when the top wall 106 of the elbow element 104 is flush with the top surface of the duct section. Thus the lug 118 prevents upward displacement of the elbow element 104 and forward displacement in one direction, and prevents downward displacement of the duct section with which the connector is used.

The elbow element 104 illustrated in Figures 14-16 is constructed so that it can also be used to close the gap in the duct 21 where duct sections meet at an outside corner of the wall, such as the corner at which the duct sections 83 and 84 of Figure 7 meet. At such a connection the back walls of the duct sections 83 and 84 terminate at the corner of the wall and this leaves an open space at the ends of the duct sections. The elbow element 104 fits into this space when turned around from the position which it occupies at an inside corner. The side walls 108 and 109 of the elbow element 104 form continuations of the fronts of the sections 83 and 84.

Figure 7 shows the duct section 84 with its cover 39 in place and the front of this cover is flush with the side wall 109 of the elbow element 104. The cover 39 is removed from the duct section 83 and is shown lying on the floor; but it will be understood that this cover 39 can be snapped into place in the front of the duct section 83 and that the elbow element 104 offers no obstruction to the insertion of the cover 39 because of the offset of the panel 112 already described in connection with Figure 14.

The end of the duct is closed by an end blank 120. The construction of this end blank 120 is shown in Figures 17-19. The end blank has an end wall 122 which extends across the open end of the duct and also across the end faces of the walls of the duct and the cover 39.

The end blank has a flat body portion 124 which fits against the back wall of the duct and which has a slot 92 and a projection 95 for receiving a ground continuity screw as already described in connection with Figures 9 and 10. The slot 92 is long enough to permit the end blank to be used at either the right or left hand end of the duct system, thus making the blank reversible. The end blank 120 has also lugs 94 for preventing vertical displacement of the end blank with respect to the duct. As in the case of the connectors which have slots for receiving screws which extend into the wall or baseboard, the end blank 120 is installed before the cover is placed on the duct.

The preferred construction has been illustrated and described, but changes and modifications can be made, and some features can be used in different combinations, without departing from the invention as defined in the claims.

What is claimed is:

1. A multiple outlet electrical system including a duct for location along the baseboard of a room, the duct having back, top and bottom walls and upper and lower extensions of the top and bottom walls, respectively, forming upper and lower portions of a front wall, the edges of which are spaced apart to leave a longitudinal opening at the front of the duct, electrical receptacles at spaced locations along the duct, conductors connecting the receptacles, the cover having openings therein at spaced locations corresponding to the locations of the receptacles, the edges of the duct along the bottom of the longitudinal opening being formed into a channel and a bottom edge face of the cover engaging the channel and with said channel providing a hinge on which the cover swings, the edge of the duct above the longitudinal opening having an inwardly inclined flange portion and the upper edge of the cover having an inwardly extending flange portion, both of the flange portions being of resilient material and free to flex, and complementary contour areas on the flange portions that snap into engagement with one another when the cover swings upwardly and rearwardly about the hinge and the flange portions exert a cam action to displace them with respect to one another to let the complementary contour areas move into register for their engagement with one another.

2. A multiple electrical system including a duct for location along a baseboard of a room, the duct having a bottom wall adapted to rest directly on the floor of the room, and having a back wall and a top wall with a longitudinal opening at the front of the duct and extending lengthwise thereof, the front wall having a portion that extends upwardly from the bottom wall for a substantial distance greater than the thickness of the floor tiles, linoleum and other conventional floor coverings, which may be used to cover the floor in front of the duct, the continuity of the duct terminating at the upper end of said portion of the front wall and forming the bottom edge of the longitudinal opening and being formed into a channel, a cover for closing the longitudinal opening, electrical receptacles at spaced locations along the duct, conductors connecting the receptacles, the cover having openings therein at spaced locations corresponding to the locations of the receptacles, the cover having a bottom edge that fits into the channel to provide a hinge on which the cover swings upwardly and inwardly to bring the openings therein into register with the receptacles, cover surfaces at the upper end of the cover and on the duct along the upper edge of the opening extending inwardly and shaped to engage with one another to hold the cover in assembled relation with the duct, the cover surfaces being yieldable with respect to one another to provide a snap action for engaging the cover with the duct as it swings about said hinge.

3. The multiple outlet electrical system described in claim 2 and in which the duct has its top wall extending downwardly at its forward edge to form an upper portion of the front wall that meets the inwardly extending surface at the top edge of the duct opening so that said inwardly extending surface forms with the top wall and upper front wall portion of the duct a channel facing inwardly, and an upwardly and forwardly extending hook connected to the top of each receptacle and shaped to engage in said channel to support the receptacles in the duct, the receptacles having front faces that project into the receptacle openings in the cover and shoulders around the projecting front faces of the receptacles behind the edge portions of the receptacle openings when the cover is in place for holding the receptacles against forward movement.

4. The multiple outlet electrical system described in claim 2 and in which the duct is made up of a plurality of unit lengths each of which is of one-piece construction and each of which encloses a chamber open at the end which connects with the next adjoining section of the duct, and the duct has a back wall for contact with a wall of the room in which the duct is used, and a top wall extending forwardly from the back wall and then downwardly to a juncture with the inwardly extending surface along the top edge of the duct opening to form an inwardly opening channel along the top edge of the duct opening, each of the receptacles being extensive enough to reach from the back wall through the receptacle openings in the cover when the cover is in place, a hook extending upwardly from the rearward part of each receptacle and then forwardly into the channel, the hook on each receptacle being shaped to pass through the clearance between the lower wall of the channel and the back wall of the duct when the receptacle is rocked forwardly and upwardly to remove it from the duct when the cover is removed, shoulders on the sides of the receptacles in position to contact with the back of the cover along the edges of the receptacle openings in the cover for holding the receptacles back against the back wall of the duct when the cover is in place, and connectors joining the different sections of the duct together and providing ground continuity for the system.

5. The multiple outlet electrical system described in claim 4 and in which the sections of the duct are made of light gage metal and the connectors between the sections have fastening means by which they are connected to the respective sections, and the connectors also have displaced projections over surfaces of the respective conduit sections with threaded openings with an end that clamps against the adjacent area of the section and that pierces any paint or lacquer on said area to establish a continuous conducting path for the ground continuity of the duct system.

6. A multiple outlet electrical system including a duct for securing to the front of a wall of a room with the duct resting on the floor of the room at the bottom of the wall, said duct including a longitudinal section of one piece construction with a back wall for connection to the wall of the room, a bottom wall for extending across the floor of the room, a top wall extending forwardly from the back wall, a front wall comprising two portions, one of which extends downwardly from the top wall and the other of which extends upwardly from the bottom wall, the portions being spaced from one another to leave an opening in the front of the duct extending lengthwise thereof, the lower portion of the front wall being of substantial height so as to locate the bottom edge of the front opening above any linoleum, tile, or other conventional covering that may be used on the floor in front of the duct when the duct is located on the floor and against a wall of a room, electrical receptacles within the duct at spaced locations along its length, conductors extending along the inside of the duct and connected with the electrical receptacles, and a snap-in cover which engages edge regions of the upper and lower portions of the front wall along the opening in the front wall to close said opening in the front of the duct, the cover having openings therein at spaced locations corresponding to the locations of the receptacles for access to said receptacles.

7. The multiple outlet electrical system described in claim 6 and in which the duct has a top wall which extends forwardly and then immediately downwardly and then inwardly to form a channel along the top edge of the front opening of the duct, and in which the receptacles are supported by hooks connected to the top of each receptacle and extending upwardly and then forwardly over the receptacle, the hooks being shaped to fit into the channel when a receptacle is moved into the duct, hook first, then rocked to move the hook upwardly behind the bottom wall of the channel and then rocked further to bring the hook into the channel, and surfaces on the receptacles which contact with the back of the cover, when the cover is in place, to prevent the receptacles from rocking forwardly again to disengage their hooks from the channel.

8. A multiple outlet electrical system including a duct for extending horizontally along a wall of a room, the duct having a front opening extending lengthwise thereof and a top wall that extends forwardly and then downwardly and inwardly to form a channel along the top edge of the duct opening, a plurality of electrical receptacles within the duct and located at spaced regions along the length of the duct, conductors within the duct connected to the receptacles for supplying power to the receptacles, and a support for each receptacle including a hook attached to and extending upwardly from the rearward portion of each receptacle and then forwardly over the forward portion of the receptacle at some distance above said forward portion, each hook being of a size to fit into the duct and to extend into the channel when the receptacle is inserted through the duct opening and rocked to project its hook upwardly and then forwardly into the channel, and a cover which closes the front opening of the duct, the cover having openings therein at spaced locations in position to expose the front faces of the receptacles and the cover having surface areas which contact with portions of the receptacles to prevent the receptacles from rocking forwardly.

9. A multiple outlet electrical system including a duct made up of a plurality of separate sections, each of which has a back wall with openings therethrough for fastening means to connect the duct to a wall, and each section of which includes also top and bottom walls extending forwardly from the back wall and held by the back wall in substantially fixed, spaced relation to one another, the sections having a front opening extending lengthwise thereof, a cover for closing the opening, a plurality of electrical receptacles at spaced locations along the length of the duct, conductors within the duct for supplying power to the electrical receptacle, the cover having openings therein at spaced locations corresponding to the locations of the electrical receptacles, connectors for joining adjacent sections of the duct together, each of the connectors having one portion that bears against the back wall of one section of the duct and another portion that bears against the back wall of the next adjacent section of the duct, each of the portions of the connector having top and bottom lugs that project forwardly and upwardly and into contact with the top and bottom walls, respectively, of the duct sections, the edges of the lugs exerting pressure against the top and bottom walls of the duct with the said top and bottom walls at the fixed spacing to which they are held by the back wall whereby the lugs scratch enamel on the duct during assembly with the duct sections, means for holding each of the connections against displacement lengthwise of the duct sections which it connects.

10. A multiple outlet electrical system including a duct made up of a plurality of separate sections, each of which has a back wall with openings therethrough for fastening means to connect the duct to a wall, and each section of which includes also top and bottom walls extending forwardly from the back wall, the sections having a front opening extending lengthwise thereof, a cover for closing the opening, a plurality of electrical receptacles at spaced locations along the length of the duct, conductors within the duct for supplying the power to the electrical receptacles, the cover having openings therein at spaced locations corresponding to the locations of the electrical receptacles, connectors for joining adjacent sections of the duct together, each of the connectors having portions that extend generally parallel to the back walls of the duct sections and that confront areas of the back walls of adjacent sections of the duct which are to be connected, each connector having openings therein for register with the openings in the back walls of adjacent duct sections for receiving the fastening means that connect the duct sections to the wall so that said fastening means also hold the connector, means for holding each of the connections against displacement and lengthwise of the duct sections which it connects, each of the connectors also having top and bottom flanges extending at large obtuse angles to the back walls of the duct sections and into contact with the top and bottom walls of both sections of the duct which are connected by the connector for preventing vertical displacement of the connection with respect to the duct and in which the connector is shaped to connect two sections of the duct which meet at an inside corner of a room with the ends of the duct sections close together but with the ends spaced progressively further apart toward said corner of the room, the connector having a top wall which is flush with the top walls of the two duct sections which it connects and which fills the space between the ends of said duct sections and the surfaces of the wall which meet at said corner, the top wall of the connector having a depressed portion that forms an offset lug extending from the top wall of the connector and into contact with the under surface of the top wall of at least one of the duct sections for preventing upward displacement of the connector with respect to the duct section, the portions of the connector which confront the back walls of the adjacent duct sections being at right angles to one another and substantially longer than the space between the ends of the duct sections at their back walls and constituting side walls of the connectors at right angles to one another and in position to fill the space between the back walls of the connector sections, and panels off-set from the side walls and extending from the side wall of the connector across the inside surfaces of the back walls of the sections of the duct, and means for connecting the panels to the respective duct sections over which they extend.

11. A multiple outlet electrical system including a duct made up of a plurality of separate sections, each of which has a back wall with openings therethrough for fastening means to connect the duct to a wall, and each section of which includes also top and bottom walls extending forwardly from the back wall, the sections having a front opening extending lengthwise thereof, a cover for closing the opening, a plurality of electrical receptacles at spaced locations along the length of the duct, conductors within the duct for supplying power to the electrical receptacles, the cover having openings therein at spaced locations corresponding to the locations of the electrical receptacles, connectors for joining adjacent sections of the duct together, each of the connectors having portions that extend generally parallel to the back walls of the duct sections and that confront areas of the back walls of adjacent sections of the duct which are to be connected, each connector having openings therein for register with the openings in the back walls of adjacent duct sections for receiving the fastening means that connect the duct sections to the wall so that said fastening means also hold the connector, means for holding each of the connections against displacement and lengthwise of the duct sections which connect each of the connectors also having top and bottom flanges extending at large obtuse angles to the back walls of the duct sections and into contact with the top and bottom walls of both sections of the duct which are connected by the connector for preventing vertical displacement of the connector with respect to the duct, and in which the connector is shaped to connect two duct sections which meet at an outside corner of the wall of a room with the ends of the rearward portions of the duct sections close together but with the ends of the duct sections spaced progressively further apart toward the fronts of the duct sections and in a forward direction away from the corner of the room, said connector including a substantially square top wall which is flush with the top walls of the duct sections for filling in the space between the ends of said duct sections, and side walls of the connector extending downwardly from the two outside edges of the top wall of the connector in position to form flush continuations of the fronts of the duct sections, and panels extending from the side walls of the connector behind portions of the fronts of the duct sections for holding the connector against outward displacement.

12. The multiple outlet electrical system described in claim 11 and in which the connector is shaped for connecting adjacent duct sections at either an inside or an outside corner of a wall, the panels which extend from the side walls of the connector being displaced inwardly from the outside surfaces of the side walls by a distance substantially equal to the thickness of the walls of the duct and having openings therein for receiving screws or other fastening means which extend through the panels and back wall of the duct to connect the duct sections to the wall of the room when the connector is used for connecting duct sections at an inside corner.

13. The multiple outlet electrical system described in claim 9 and in which there is an end plate having a wall which closes the end of a duct section and also having lugs which extend inwardly for contact with the top wall of a duct section to prevent vertical displacement of the end plate with respect to the duct section.

References Cited in the file of this patent

UNITED STATES PATENTS

| | | |
|---|---|---|
| 1,817,034 | Hotchkin | Aug. 4, 1931 |
| 2,039,982 | Schaller | May 5, 1936 |
| 2,072,702 | Beersman | Mar. 2, 1937 |
| 2,132,400 | Curren | Oct. 11, 1938 |
| 2,136,583 | Corbett | Nov. 15, 1938 |
| 2,156,633 | La Ducer | May 2, 1939 |
| 2,489,956 | Crook | Nov. 29, 1949 |
| 2,579,854 | Perkins | Dec. 25, 1951 |
| 2,637,462 | Becker | May 5, 1953 |
| 2,673,967 | Hedgecock | Mar. 30, 1954 |
| 2,743,423 | Parks | Apr. 24, 1956 |